United States Patent
Sapozhnikov et al.

(10) Patent No.: US 9,478,239 B2
(45) Date of Patent: Oct. 25, 2016

(54) READER STRUCTURE WITH BARRIER LAYER CONTACTING SHIELD

(71) Applicant: Seagate Technology LLC, Cupertino, CA (US)

(72) Inventors: Victor Boris Sapozhnikov, Minnetonka, MN (US); Mohammed Sharia Ullah Patwari, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 13/929,150

(22) Filed: Jun. 27, 2013

(65) Prior Publication Data

US 2015/0002964 A1  Jan. 1, 2015

(51) Int. Cl.
*G11B 5/39* (2006.01)
*G11B 5/11* (2006.01)

(52) U.S. Cl.
CPC ........... *G11B 5/3932* (2013.01); *G11B 5/3909* (2013.01); *G11B 5/3912* (2013.01); *G11B 2005/3996* (2013.01)

(58) Field of Classification Search
CPC .................................................. G11B 5/3912
USPC ........................................................ 360/319
See application file for complete search history.

(56) References Cited

U.S. PATENT DOCUMENTS

| | | | |
|---|---|---|---|
| 5,650,958 A * | 7/1997 | Gallagher | B82Y 10/00 257/E21.665 |
| 6,496,335 B2 | 12/2002 | Gill | |
| 7,180,712 B1 | 2/2007 | Li et al. | |
| 7,220,499 B2 * | 5/2007 | Saito | G11B 5/3929 360/324.11 |
| 7,606,007 B2 | 10/2009 | Gill | |
| 7,706,108 B2 | 4/2010 | Gill | |
| 7,961,438 B2 | 6/2011 | Mizuno et al. | |
| 7,974,048 B2 | 7/2011 | Shimazawa et al. | |
| 8,049,997 B2 | 11/2011 | Miyauchi et al. | |
| 8,189,303 B2 | 5/2012 | Hara et al. | |
| 8,305,715 B2 | 11/2012 | Mauri et al. | |
| 2002/0085323 A1 * | 7/2002 | Smith | G11B 5/3909 360/324.12 |
| 2003/0179513 A1 * | 9/2003 | Pinarbasi | G11B 5/3903 360/324.12 |
| 2003/0231437 A1 * | 12/2003 | Childress | G11B 5/3903 360/324.2 |
| 2004/0075959 A1 * | 4/2004 | Gill | G11B 5/3932 360/324.12 |
| 2004/0109264 A1 * | 6/2004 | Gill | G11B 5/3906 360/324.12 |
| 2006/0094129 A1 * | 5/2006 | Pinarbasi | G11B 5/39 438/3 |
| 2006/0158792 A1 * | 7/2006 | Gill | G11B 5/3912 360/324.11 |

(Continued)

*Primary Examiner* — Craig A. Renner
(74) *Attorney, Agent, or Firm* — HolzerIPLaw, PC (57) ABSTRACT

Implementations disclosed herein include a reader comprising a magnetically free layer and first barrier layer, wherein the barrier layer is in direct contact with a bottom shield in a down-track direction. Another implementation includes a device comprising a sensor stack comprising a free layer and a barrier layer; a synthetic antiferromagnetic shield layer comprising a reference layer and a pinned layer, wherein direction of magnetization of the reference layer forms an obtuse angle with direction of magnetization of the free layer in a quiescent state.

14 Claims, 10 Drawing Sheets

(56) References Cited

U.S. PATENT DOCUMENTS

| | | |
|---|---|---|
| 2009/0279213 A1 | 11/2009 | Wu et al. |
| 2010/0027168 A1 | 2/2010 | Chou et al. |
| 2010/0039734 A1 | 2/2010 | Hara et al. |
| 2010/0067148 A1 | 3/2010 | Tsuchiya et al. |
| 2010/0149689 A1 | 6/2010 | Tsuchiya et al. |
| 2011/0007925 A1 | 1/2011 | Akino |
| 2011/0051291 A1* | 3/2011 | Miyauchi et al. ............ 360/319 |
| 2011/0279923 A1* | 11/2011 | Miyauchi et al. ............ 360/319 |
| 2011/0317313 A1* | 12/2011 | Miyauchi et al. ............ 360/319 |
| 2012/0063035 A1 | 3/2012 | Childress et al. |
| 2012/0087045 A1* | 4/2012 | Yanagisawa ......... G11B 5/3912 360/319 |
| 2012/0327537 A1 | 12/2012 | Singleton et al. |
| 2013/0288076 A1* | 10/2013 | Singleton et al. ......... 428/811.1 |

* cited by examiner

READER STRUCTURE WITH BARRIER LAYER CONTACTING SHIELD

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An apparatus disclosed herein includes a sensor stack including a first layer and a barrier layer, wherein the barrier layer is in contact with a bottom shield. These and various other features and advantages will be apparent from a reading of the following detailed description.

DETAILED DESCRIPTIONS

There is an increasing demand for high data densities and sensitive sensors to read data from a magnetic media. Giant Magnetoresistive (GMR) sensors that have increased sensitivity consist of two ferromagnetic layers separated by a thin conductive, non-magnetic spacer layer such as copper. Tunnel Magnetoresistive (TMR) sensors the electrons travel in the direction perpendicular to the layers across a thin insulating barrier. An antiferromagnetic (AFM) material is placed adjacent to the first magnetic layer (called pinned layer (PL)) to prevent it from rotation. AFM materials exhibiting this property are termed "pinning materials". With its rotation inhibited, the first soft layer is termed the "pinned layer". The second soft layer rotates freely in response to an external field and is called the "free layer (FL)."

To operate the MR sensor properly, the sensor be stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. In order to increase the stiffness of the PL, "synthetic antiferromagnet" (SAF) is used in the PL. The use of the AFM/PL allows for consistent and predictable orientation of the SAF structure. Furthermore, the use of AFM/PL also provides stable structure to enable high amplitude linear response for a reader using the MR sensor.

However, using the AFM/PL structure increases the shield-to-shield spacing (SSS) of the reader. As the pulse width fluctuations PW50 of magnetic sensors, which determine the signal-to-noise (SNR) ratio in a recording system depends on the SSS of the header, achieving a lower SSS results in lower PW50 and increased SNR. An example of the relationship between the PW50 and SSS, as suggested by both modeling and experiments can be given as follows:

$$\Delta PW50 \approx 0.3 * \Delta SSS$$

Thus, a reduction in the SSS leads to reduction in the value of the PW50 and therefore, an increase in the value of the SNR for the recording system. Thus, higher linear density of the reader can be achieved by reducing the SSS. Furthermore, smaller SSS also improves the cross-track resolution of the media reader and such reduction in cross-track resolution contributes to further improvement of the areal density that can be achieved by the media reader.

An MR sensor disclosed herein reduces the SSS by removing the AFM and SAF layer from a sensor stack and by providing a barrier layer in direct contact with a bottom shield of the MR sensor. Specifically, the MR sensor includes a sensor stack with a free layer, a barrier layer adjacent to the free layer and a bottom shield in direct contact with the barrier layer. In an alternative implementation, the sensor stack may also include a barrier layer between the free layer and a top shield.

Figure 1:
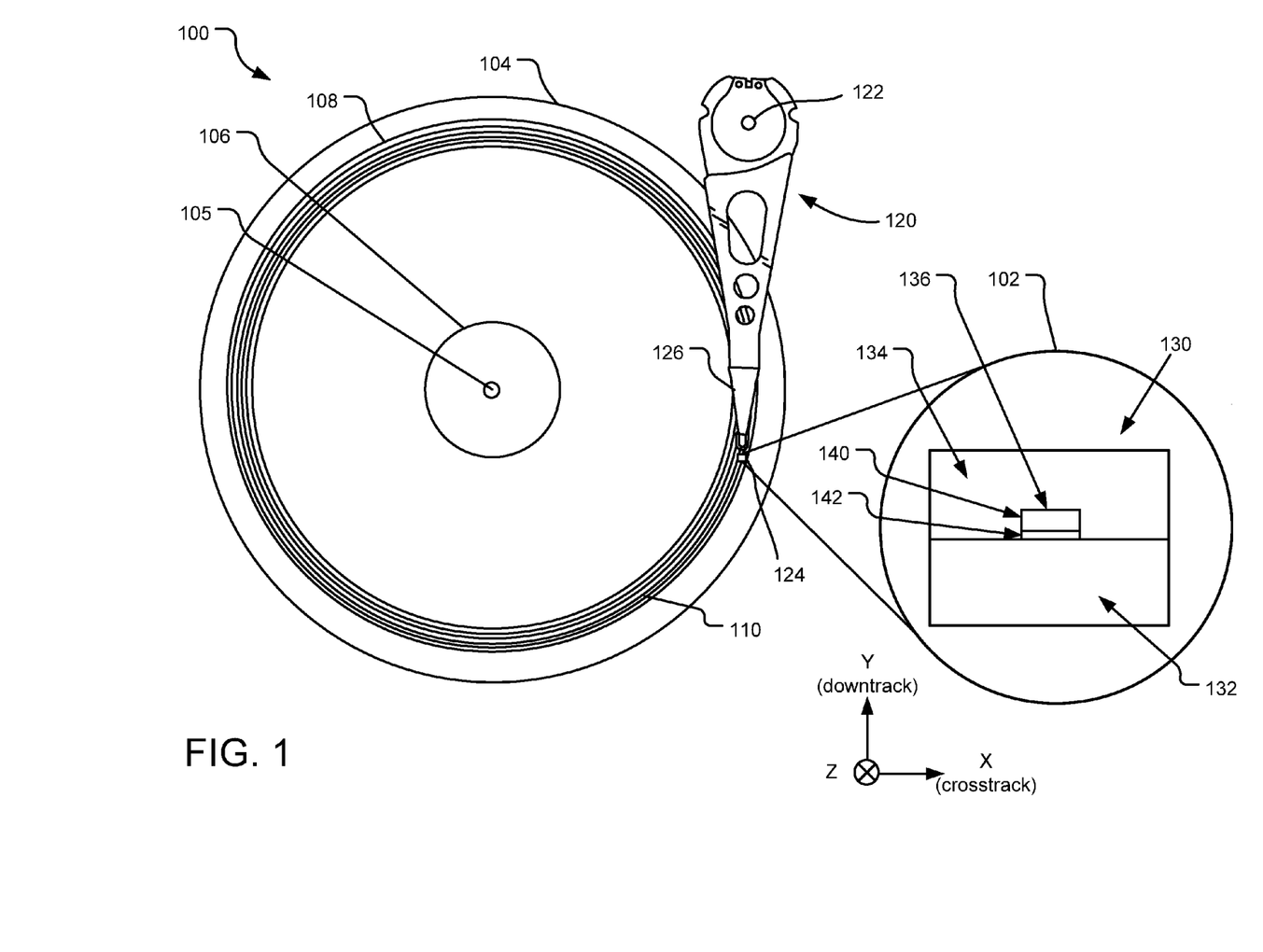
FIG. 1 illustrates a data storage device having an example MR sensor.

FIG. 1 illustrates a data storage device 100 having an example MR sensor, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks 110 on the storage medium 104. A transducer head assembly 124 is mounted on an actuator arm 126 of an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

The exploded view 102 schematically illustrates an air-bearing surface (ABS) view of an MR sensor 130. The MR sensor 130 includes a bottom shield 132, a top shield 134, and a sensor stack 136 located between the bottom shield 132 and the top shield 134 along a down-track direction. The sensor stack 136 may include a free layer 140 and a barrier layer 142 wherein the barrier layer 142 is in contact with the bottom shield 132. Yet alternatively, the sensor stack 136 may also include a barrier layer (not shown) between the free layer 140 and the top shield 134.

The bottom shield 132 may include an SAF structure (not shown) including an SAF reference layer and an SAF pinned layer, wherein the SAF reference layer and an SAF pinned layer are separated by a non-magnetic layer. In one alternative implementation, the bottom shield 132 is removed and a SAF stack (not shown) is used in place of the bottom shield 132, wherein the SAF stack includes an SAF reference layer and an SAF pinned layer separated by a non-magnetic layer. While the MR sensor 130 disclosed in FIG. 1 provides for the sensor stack 136 and the bottom shield 132 to have the substantially same thickness in the cross-track direction, in an alternative implementation, the thickness of the sensor stack 136 and the bottom shield 132 may be different from each other. For example, the thickness of the bottom shield 132, or the SAF stack provided in place of the bottom shield 132, may be less than the thickness of the sensor stack 136.

The SAF structure of the bottom shield 132 may be pinned such that the pinning direction of the pinned layer of the SAF structure is substantially orthogonal to the ABS of the MR sensor 130. Furthermore, the direction of magnetization in the reference layer of the SAF structure in the bottom shield 132 is substantially antiparallel to the magnetization in the pinned layer of the SAF structure in the bottom shield 132. Note that while the direction of the magnetizations of the various layers of the SAF structure are generally orthogonal to the ABS, in the vicinity of the ABS of the sensor 130, the direction of magnetizations may have a component (as disclosed below in FIG. 5 below) that is parallel to the ABS of the sensor 130.

The top shield 134 may also comprise side shields (not shown) located on two sides of the sensor stack 136 in a cross-track direction. In an alternative implementation, permanent magnets (not shown) are provided on the two sides of the sensor stack 136 in the cross-track direction. Alternatively, the top shield 134 may also include an SAF structure (not shown) with an SAF reference layer and an SAF pinned layer, separated by a non-magnetic layer. While the pinning direction of the SAF structure in the bottom shield 132 is in a direction substantially orthogonal to the ABS of the sensor 130, the pining direction of the SAF structure in the top shield 134 is in a direction substantially parallel to the ABS of the sensor 130.

Figure 2:
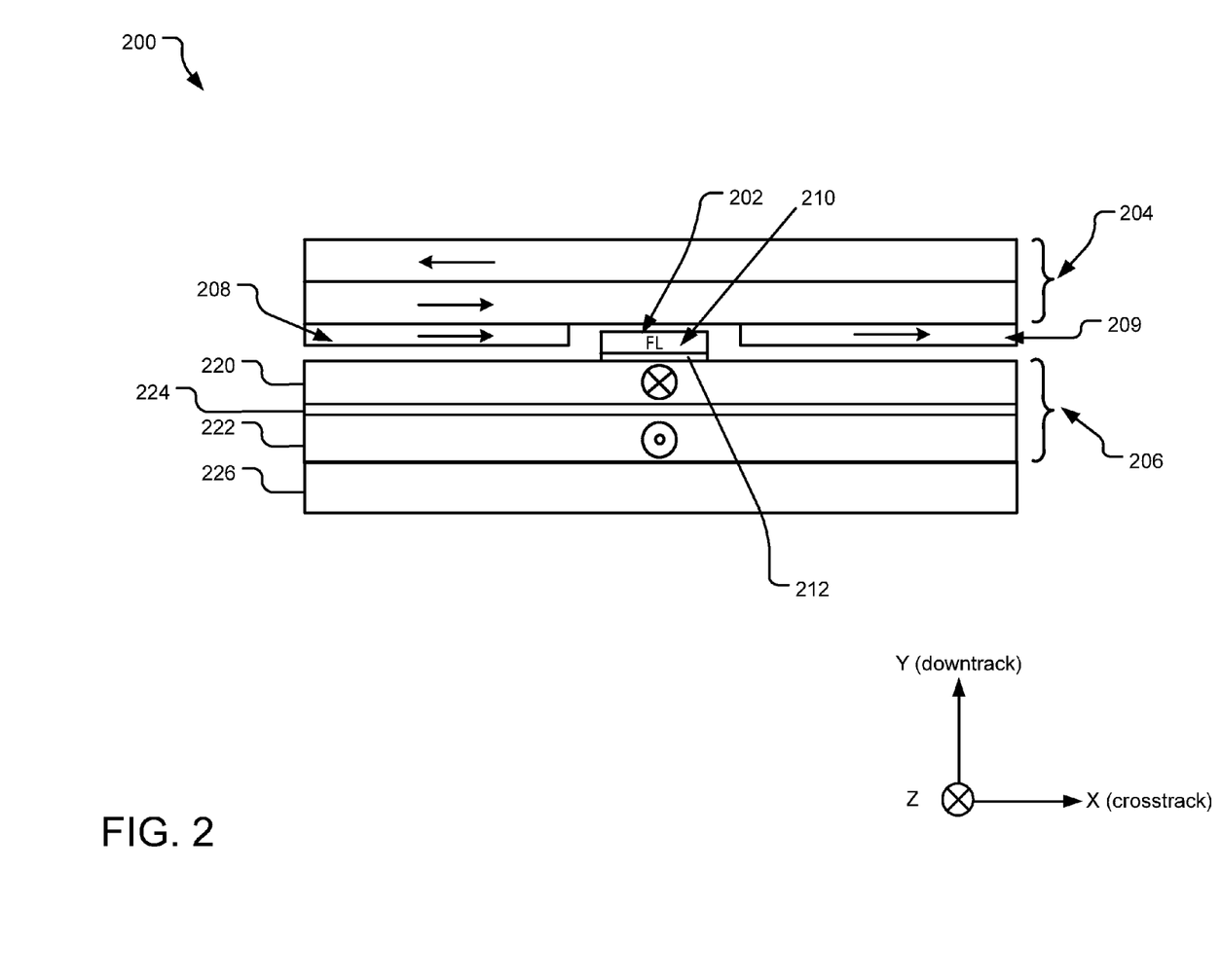
FIG. 2 illustrates an ABS view of an example implementation of an MR sensor.

FIG. 2 illustrates an ABS view of an example implementation of an MR sensor 200. Specifically, the MR sensor 200 includes a sensor stack 202 located between (in down-track direction) a top shield 204 and a bottom shield 206. Furthermore, the sensor stack 202 is between (in cross-track direction) two side shields 208 and 209 made of ferromagnetic material. However, in an alternative implementation, the side shields 208 and 209 may be replaced by permanent magnets.

In one implementation, the sensor stack 202 includes a free layer 210 and a barrier layer 212. The magnetic orientation of the free layer 210 rotates freely in response to external field, such as a magnetic field from a media. Specifically, the free layer 210 is not exchange coupled to any antiferromagnet (AFM). As a result, the magnetic moment of the free layer 210 is free to rotate under the influence of an applied magnetic field in a range of interest. The free layer 210 may also include a cap layer (not shown).

The bottom shield 206 may comprise an SAF structure including an SAF reference layer 220 and an SAF pinned layer 222, separated by a non-magnetic layer 224. The SAF reference layer 220 and the SAF pinned layer 222 are antiferromagnetically coupled through the non-magnetic layer 224, such as Ruthenium (Ru), via RKKY exchange interaction between the layers 220 and 222. Such an RKKY SAF structure reduces the effect of demagnetizing fields, thus improving the stability provided by the bottom shield 206. The magnetic orientation of the SAF pinned layer 222 is substantially orthogonal to the ABS of the sensor 200. Furthermore, the magnetic orientation of the SAF reference layer 220 is also orthogonal to the ABS of the sensor 200 and antiparallel to the magnetic orientation of the SAF pinned layer 222. The SAF pinned layer 222 is pinned by an antiferromagnetic (AFM) layer 226. In an alternative implementation, the SAF pinned layer 222 is pinned to have a component that is orthogonal to the ABS of the sensor 200, such that the resulting magnetic orientation of the SAF reference layer 220 makes an obtuse angle with respect to the magnetic orientation of the free layer 210 in a quiescent state.

The barrier layer 212 separates the free layer 210 from the SAF structure of the bottom shield 206. The barrier layer 212 is sufficiently thin that quantum mechanical electron tunneling occurs between the reference layer 220 and the free layer 210. The electron tunneling is electron-spin dependent, making the magnetic response of the sensor 200 a function of the relative orientations and spin polarizations of the SAF structure of the reference layer 220 and the free layer 210. The highest probability of electron tunneling occurs when the magnetic moments of the SAF structure of the reference layer 220 and the free layer 210 are parallel, and the lowest probability of electron tunneling occurs when the magnetic moments of the SAF structure of the reference layer 220 and the free layer 210 are antiparallel. Accordingly, the electrical resistance of the sensor 200 changes in response to an applied magnetic field. The data bits on the data discs in the disc drive are magnetized in a direction orthogonal to the plane of FIG. 2, either into the plane of the FIG. 2, or out of the plane of the FIG. 2. Thus, when the sensor 200 passes over a data bit, the magnetic moment of the free layer 210 is rotated either into the plane of FIG. 2 or out of the plane of FIG. 2, changing the electrical resistance of the sensor 200. The value of the bit being sensed by the sensor 200 (e.g., either 1 or 0) may therefore be determined based on the current flowing from a first electrode to a second electrode connected to the sensor 200.

Figure 3:
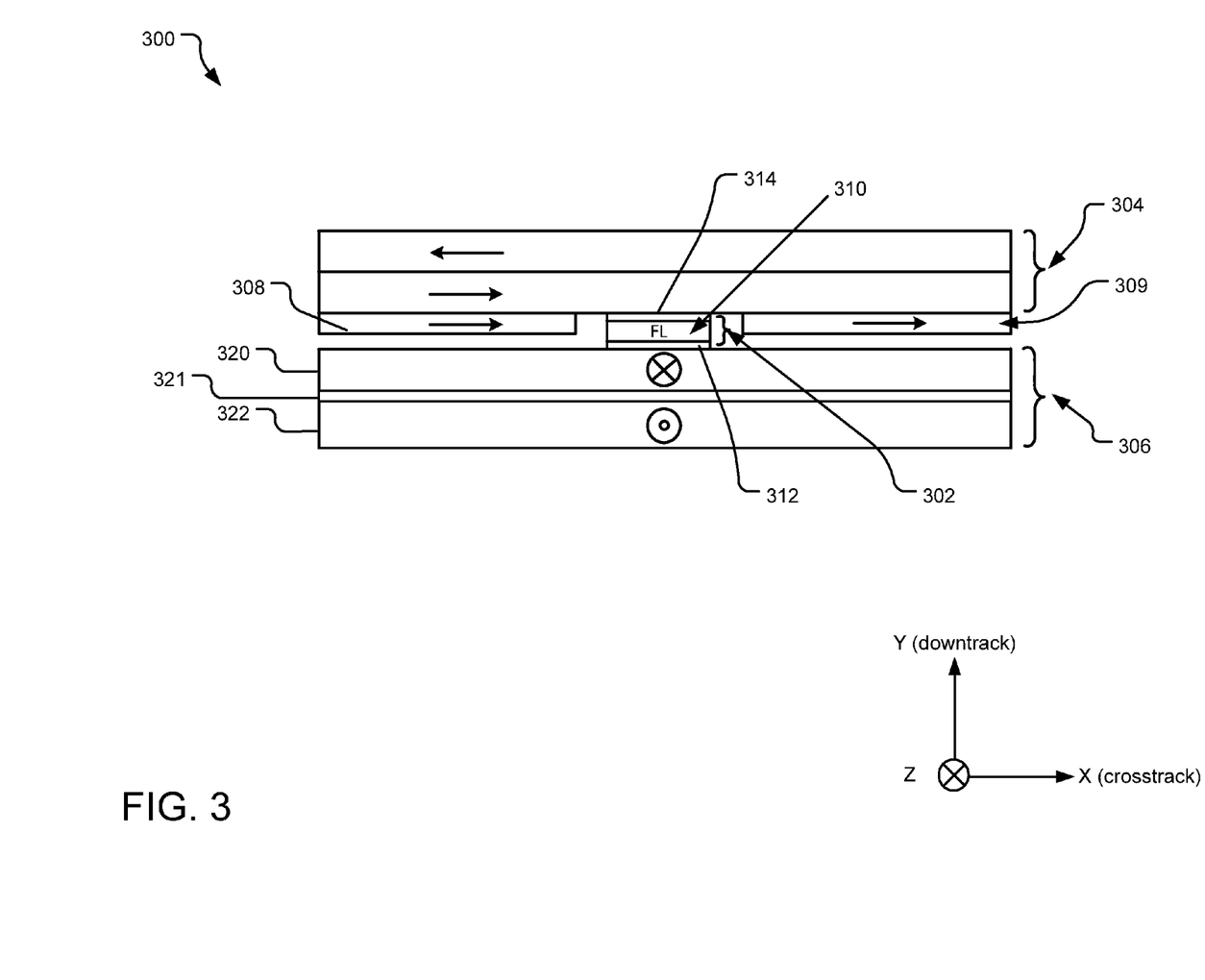
FIG. 3 illustrates an ABS view of an alternative example implementation of an MR sensor.

FIG. 3 illustrates an ABS view of an alternative example implementation of an MR sensor 300. Specifically, the MR sensor 300 includes a sensor stack 302 located between (in down-track direction) a top shield 304 and a bottom shield 306. Furthermore, the sensor stack 302 is between (in cross-track direction) two side shields 308 and 309. However, in an alternative implementation, the side shields 308 and 309 may be replaced by permanent magnets. The bottom shield 306 may include a SAF structure, including a SAF reference layer 320 and a SAF pinned layer 322 separated by a non-magnetic layer 321. The arrangement of the various layers within the sensor stack 302 is substantially similar to the sensor stack 202, except that the sensor stack 302 also includes a barrier layer 314 between the free layer 310 and the top shield 304. Specifically, the barrier layer 314 is in contact with an SAF structure of the top shield 302. Providing the barrier layer 314 between the free layer 310 and the top shield 304 further improves the SNR by reducing signal noise and provides an additional tuning parameter for controlling the performance of the sensor 300.

Figure 4:
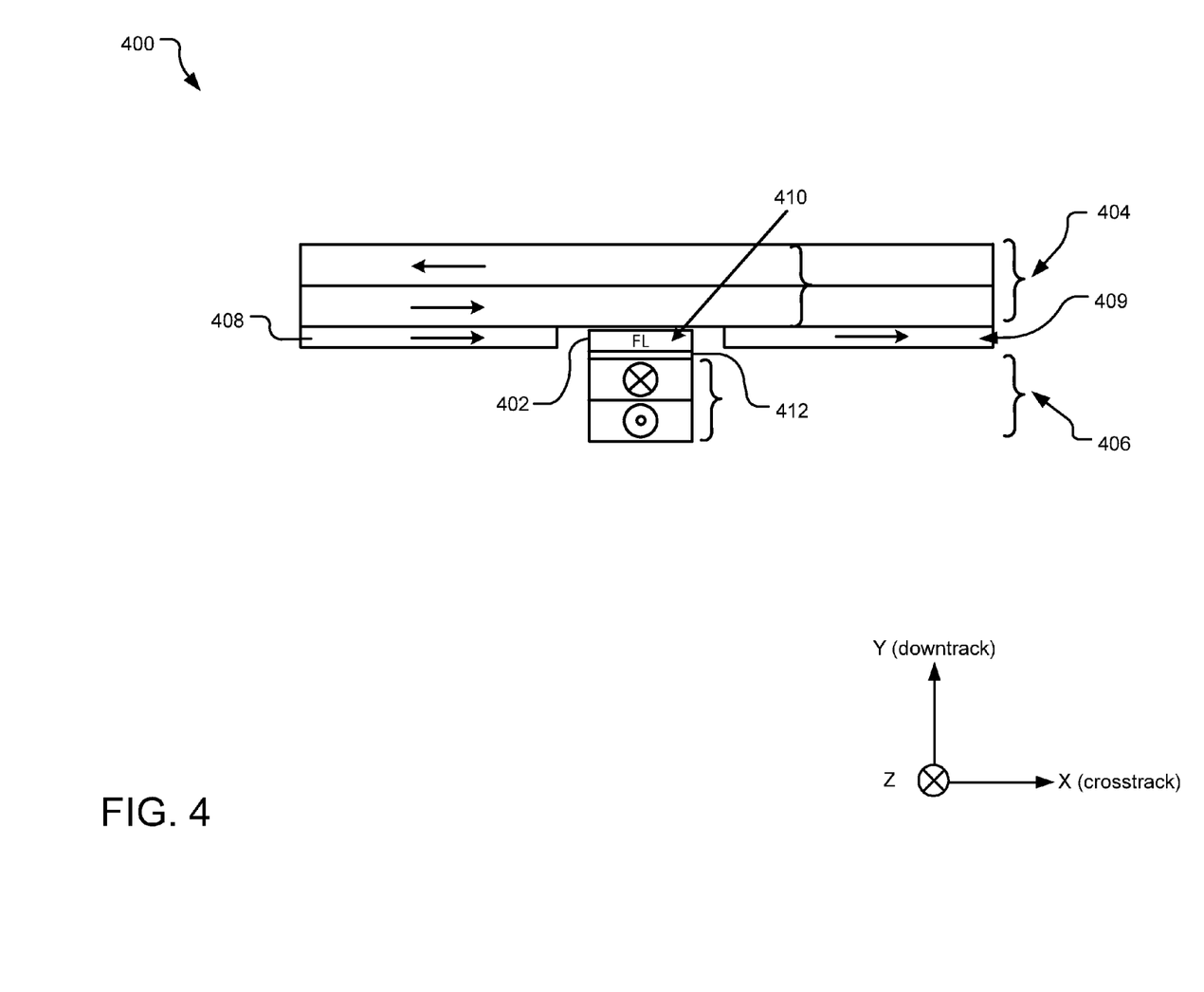
FIG. 4 illustrates an ABS view of an alternative example implementation of an MR sensor.

FIG. 4 illustrates an ABS view of an alternative example implementation of an MR sensor 400. Specifically, the MR sensor 400 includes a sensor stack 402, which includes a free layer 410. The sensor stack 402 is located between (in down-track direction) a top shield 404 and an SAF stack 406. Furthermore, the sensor stack 402 is between (in cross-track direction) two side shields 408 and 409. However, in an alternative implementation, the side shields 408 and 409 may be replaced by permanent magnets. The arrangement of the various layers within the sensor stack 402 is substantially similar to the sensor stack 402. The SAF stack 406 may have a width (in cross-track direction) that is substantially smaller than the width (in the cross-track direction) of the top shield 404. For example, the width of the SAF stack 406 may be substantially similar to the width of the sensor stack 402. In alternative implementations, the width of the SAF stack 406 may be between the width of the sensor stack 402 and the width of the top shield 404. Furthermore, the thickness (in a down-track direction) of the SAF stack 402 may be larger than the thickness of the sensor stack 202 disclosed in FIG. 2.

While the implementations of FIGS. 2-4 illustrate a barrier layer (212, 312, 412) in contact with the SAF structure in a bottom shield or with an SAF stack, in an alternative implementation, a thin magnetic layer decoupled from bottom shield (not shown) may be separating the barrier layer from the bottom shield of the SAF stack.

Figure 5:
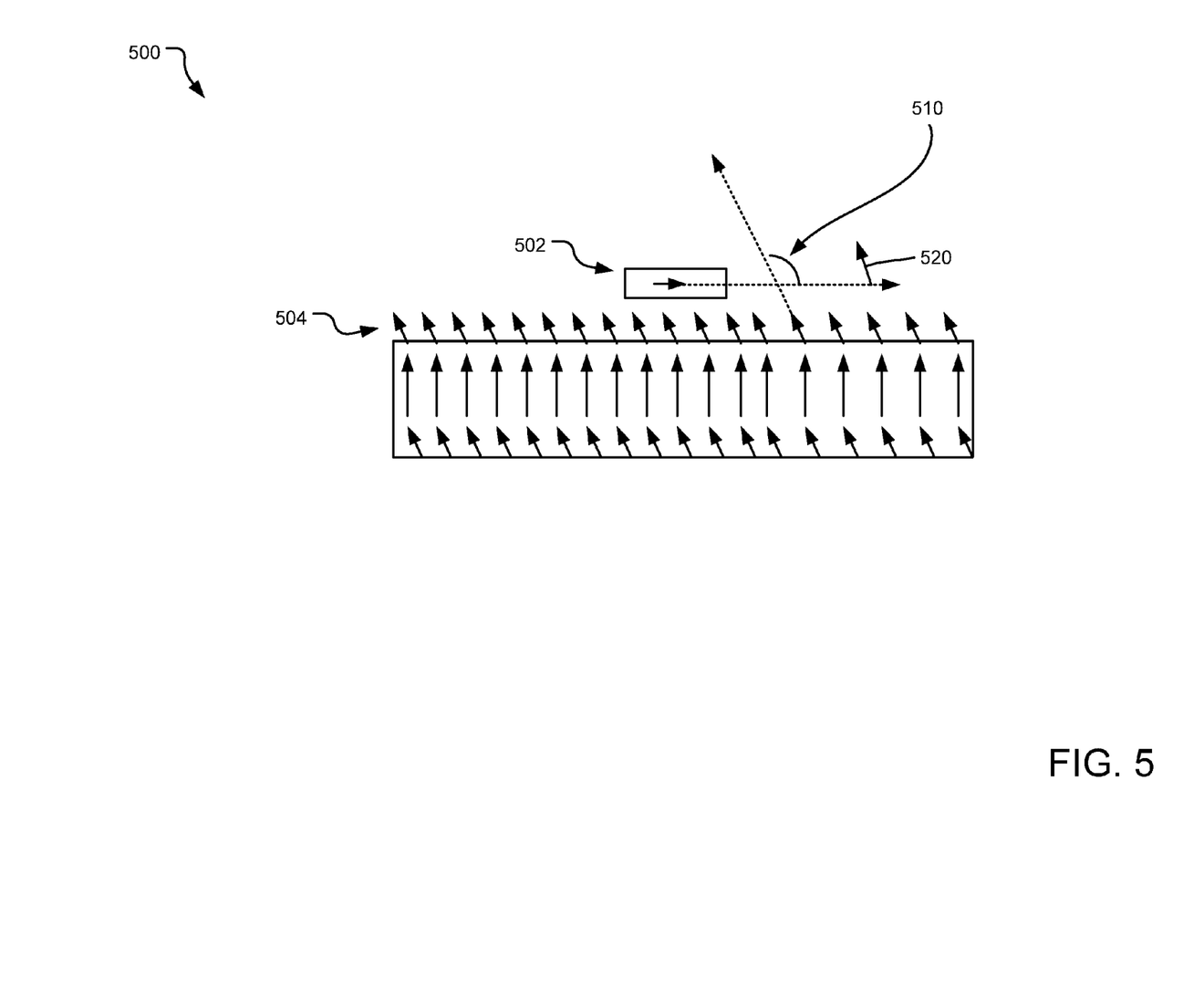
FIG. 5 illustrates magnetization maps of various magnetic layers of the MR sensor disclosed herein.

FIG. 5 illustrates magnetization maps 500 of various magnetic layers of the MR sensor disclosed herein. Specifically, FIG. 5 shows the direction of free layer magnetic orientation 502 and the direction of reference layer magnetic orientation 504. The reference layer is in the SAF structure of the bottom shield. The illustrated directions are in the quiescent states, that is, in the absence of an external magnetic field such as a field from a data bit of a magnetic media. As illustrated in FIG. 5, the free layer magnetic orientation 502 and the direction of reference layer magnetic orientation 504 at the ABS form an obtuse angle 510, which results in stronger signal generated by the sensor in the form of the current flowing from a first electrode to a second electrode connected to the sensor. Such obtuse angle between the directions of magnetic orientation is achieved due to the pinning in the SAF structure being orthogonal to the ABS of the sensor or canted so that the angle is even more obtuse. In the presence of an external signal (non-quiescent state), the free layer magnetic orientation 502 rotates towards the reference layer magnetic orientation 504, as illustrated by the arrow 520.

Figure 6:
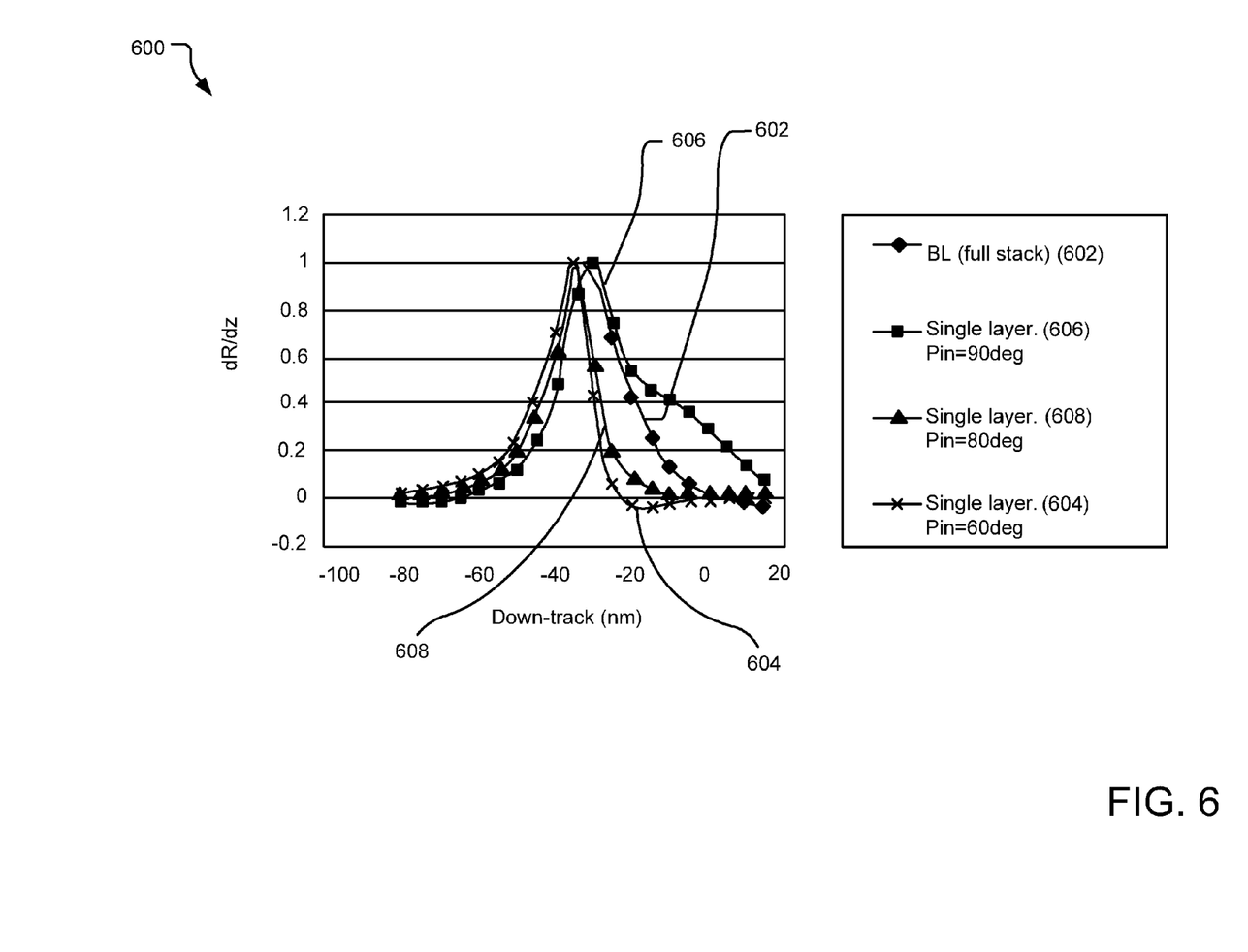
FIG. 6 illustrates a graph of transition readback derivatives in the down-track direction for various MR sensor configurations.

FIG. 6 illustrates a graph 600 of a transition readback derivatives in the down-track direction for various MR sensor configurations, wherein the transition is caused by the information stored on a digital media. Specifically, the graph 600 illustrates the change in the transition readback signal dR/dz as a function of down-track movement of the sensor over the media. The pulse 602 illustrates the transition readback where the sensor stack includes the SAF structure as part of the stack. The pulse 604 illustrates the transition readback for the sensor disclosed herein where the sensor includes a free layer and a barrier in contact with an SAF structure of a bottom shield (or with an SAF stack) for the angles between the pinning direction of SAF structure and free layer of 60 degrees. Specifically, the pulse 604 represents the implementation where the cross-track component of the magnetic orientation of reference layer of bottom shield SAF structure is opposite the magnetic orientation of the free layer. In this case, the magnetic orientation of the free layer and the magnetic orientation of the reference layer of SAF structure of a bottom shield form an obtuse angle with each other due to the rotation of the magnetization of the reference layer of SAF structure in the bottom shield opposite the direction of rotation of the magnetic orientation of the free layer. As shown, the pulse 604 has much narrower width compared to the width of the pulse 602, illustrating the improvement (reduction) in the PW50. Additionally, FIG. 6 also illustrates pulses 606 and 608 of the transition readback for the sensor disclosed herein where the sensor includes a free layer and a barrier in contact with an SAF structure of a bottom shield (or with an SAF stack) for the angles between the pinning direction of SAF structure and free layer of 90 degrees and 80 degrees, respectively.

Figure 7:
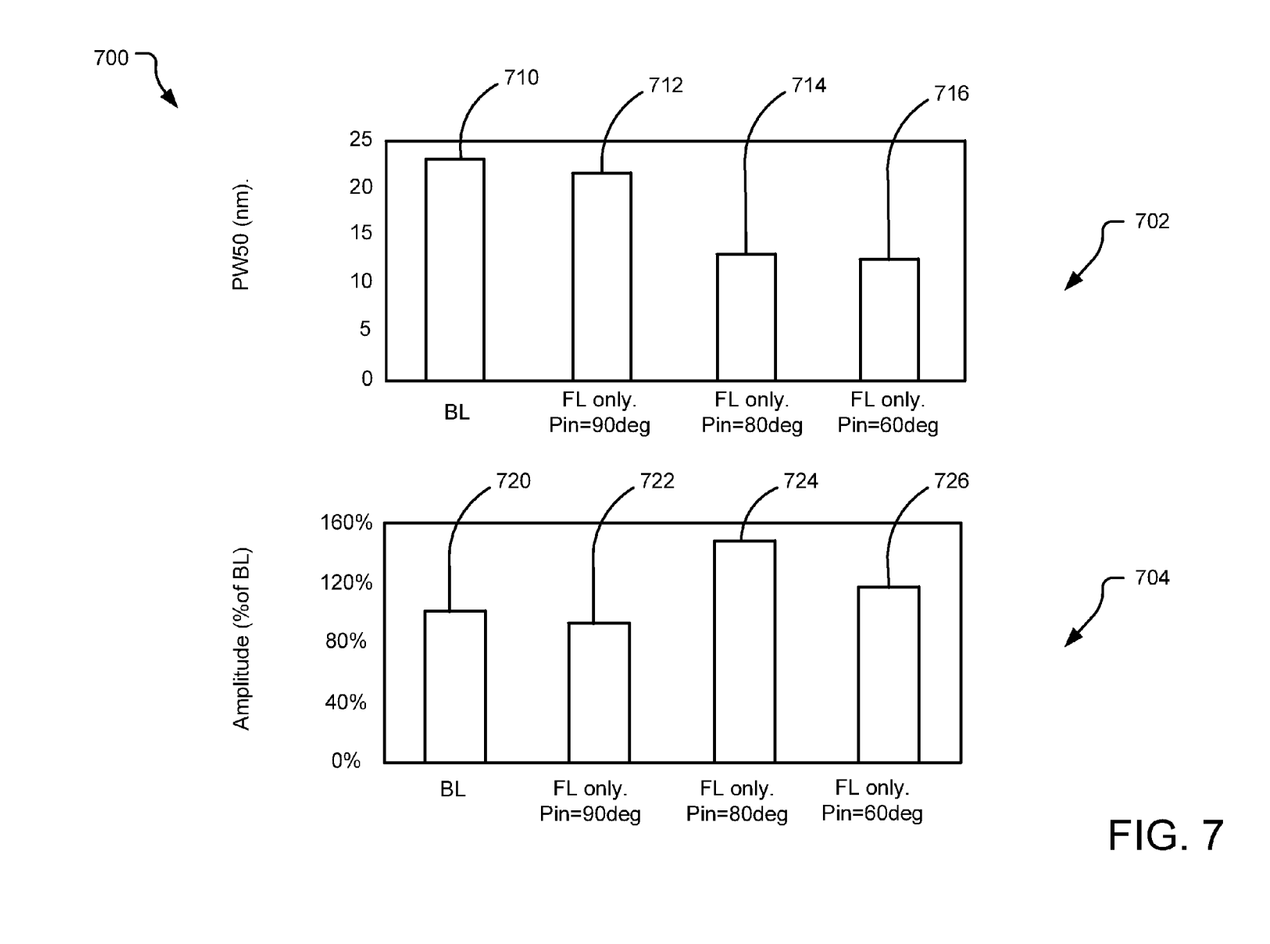
FIG. 7 illustrates graphs of comparative PW50 performance and amplitude for various MR sensor configurations.

FIG. 7 illustrates graphs 700 of comparative PW50 performance and amplitude performance for various MR sensor configurations. Specifically, the graph 702 illustrates that the PW50 710 for a sensor having a full sensor stack (including SAF structure within the sensor stack) compared to the PW50 712, 714, and 716 for various variations of the sensor disclosed herein. As illustrated, the PW50 710 is higher than the PW50 712-716, however, the improvement (reduction) in PW50 is much larger when the pinning angle in the SAF structure in the bottom shield is less than perpendicular (90 degrees) to the ABS.

On the other hand, the graph 704 illustrates the amplitude 720 of readback signal for a sensor having a full sensor stack (including SAF structure within the sensor stack) compared to the amplitudes 722, 724, and 726 of readback signals for various variations of the sensor disclosed herein. As illustrated, the amplitude 720 is lower than the amplitudes 724-726, but it is higher than the amplitude 722. This illustrates that the improvement (increase) in the amplitude is much larger when the pinning angle in the SAF structure in the bottom shield is less than perpendicular (90 degrees) to the ABS. While some of the improvement in the PW50 is due to the reduction in the SSS for the sensor, the remaining improvement in the PW50 is due to the movement of the magnetic orientation of the SAF structure in the bottom shield in the direction opposite the magnetic orientation of the free layer. Note that the movement in the magnetic orientation of the bottom shield SAF structure happens earlier, as the bottom shield is affected by the readback transition earlier than the FL (this is due to the fact that the bottom shield precedes the free layer in the down-track direction).

The increase in the amplitude of readback signal results in improved SNR for the sensor. As illustrated by graphs 702 and 704, the PW50 and the readback amplitude of the sensor can be controlled by controlling the pining angle of the SAF structure in the bottom shield with respect to the ABS of the sensor, Thus, the pinning angle can be used as tuning parameter for controlling the design and performance of the sensor. Additional control may be achieved by providing a barrier between the free layer of the sensor and an SAF structure in the top shield of the sensor.

Figure 8:
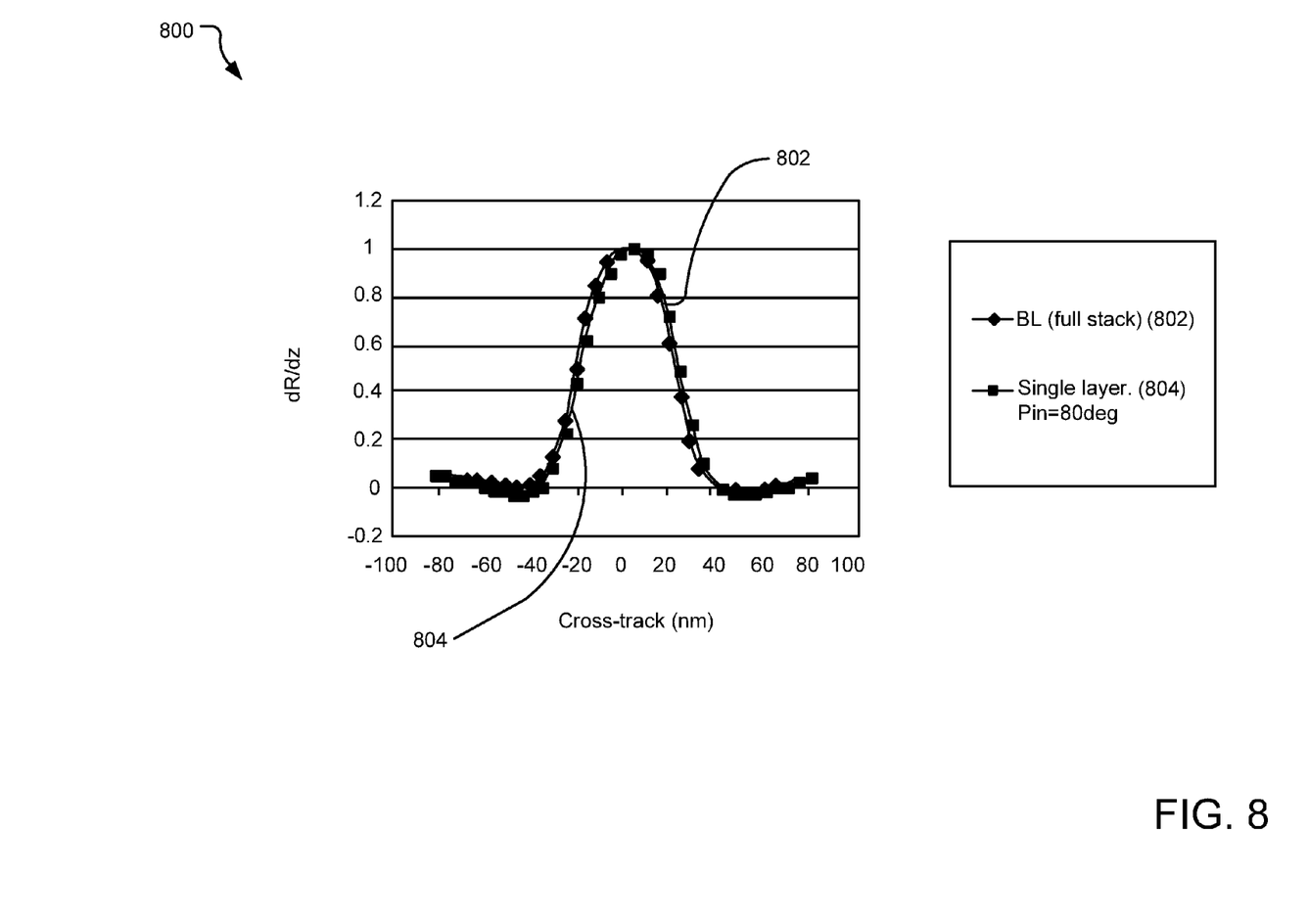
FIG. 8 illustrates an alternative graph of microtrack readback in the cross-track direction for various MR sensor configurations.

FIG. 8 illustrates an alternative graph 800 of a microtrack readback in the cross-track direction for various MR sensor configurations. Specifically, the line 802 illustrates the microtrack readback in cross-track direction where the sensor stack includes the SAF structure as part of the stack, whereas the line 804 illustrates the transition readback in cross-track direction where the SAF structure is in the bottom shield. As illustrated, there is no significant difference between the readback signals, showing that the cross-track performance of the sensor is not adversely affected by the design having the SAF structure in the bottom shield.

Figure 9:
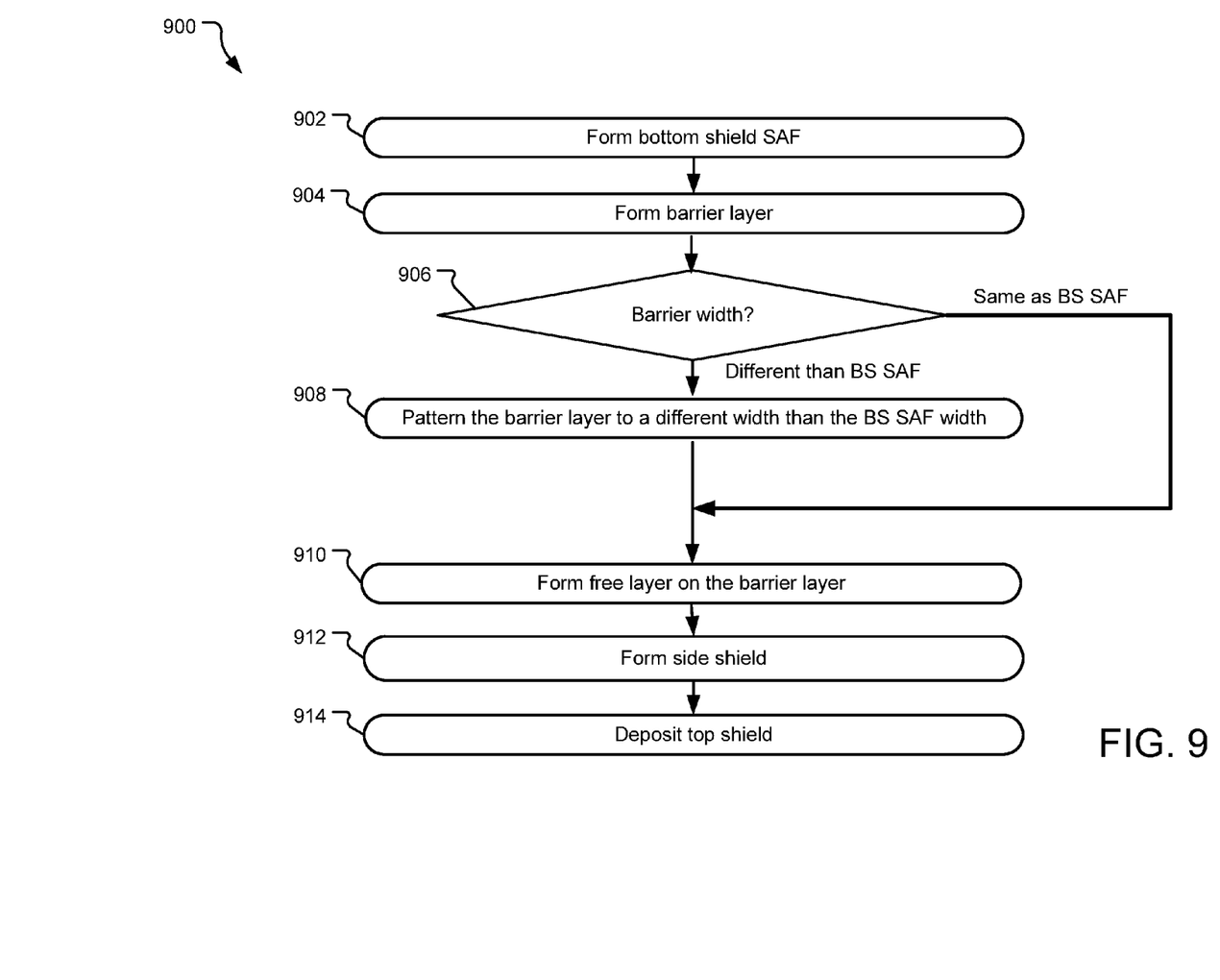
FIG. 9 illustrates example operations illustrating manufacturing a magnetoresistive sensor illustrated herein.

FIG. 9 illustrates example operations 900 illustrating manufacturing a magnetoresistive sensor illustrated herein. An operation 902 forms a bottom shield SAF structure. The operation 902 may include depositing a ferromagnetic layer, a barrier layer, and a ferromagnetic layer to form the bottom shield SAF structure. Subsequently an operation 904 forms a barrier layer of the sensor stack. An operation 906 determines if the width of the sensor stack is substantially the same as the width of the bottom shield or not. If the widths are different, an operation 908 patterns the barrier layer of the sensor stack to be of different width than the width of the bottom shield SAF structure. In one implementation, a barrier layer may also be formed on top of the free layer of the sensor stack. Subsequently, an operation 910 forms a free layer on the barrier layer of the sensor stack. An operation 912 forms a side shield (or permanent magnets). Finally, an operation 914 deposits a top shield as a single layer on the free layer and side shields. Alternatively, the operation 914 may deposit the top shield as an SAF structure. If operation 906 determines that the width of the sensor stack is substantially the same as the width of the bottom shield, operation 908 does not take place, and operation 910 forms a free layer on the barrier layer of the sensor stack. Subsequently, operations 912 and 914 follow.

Figure 10:
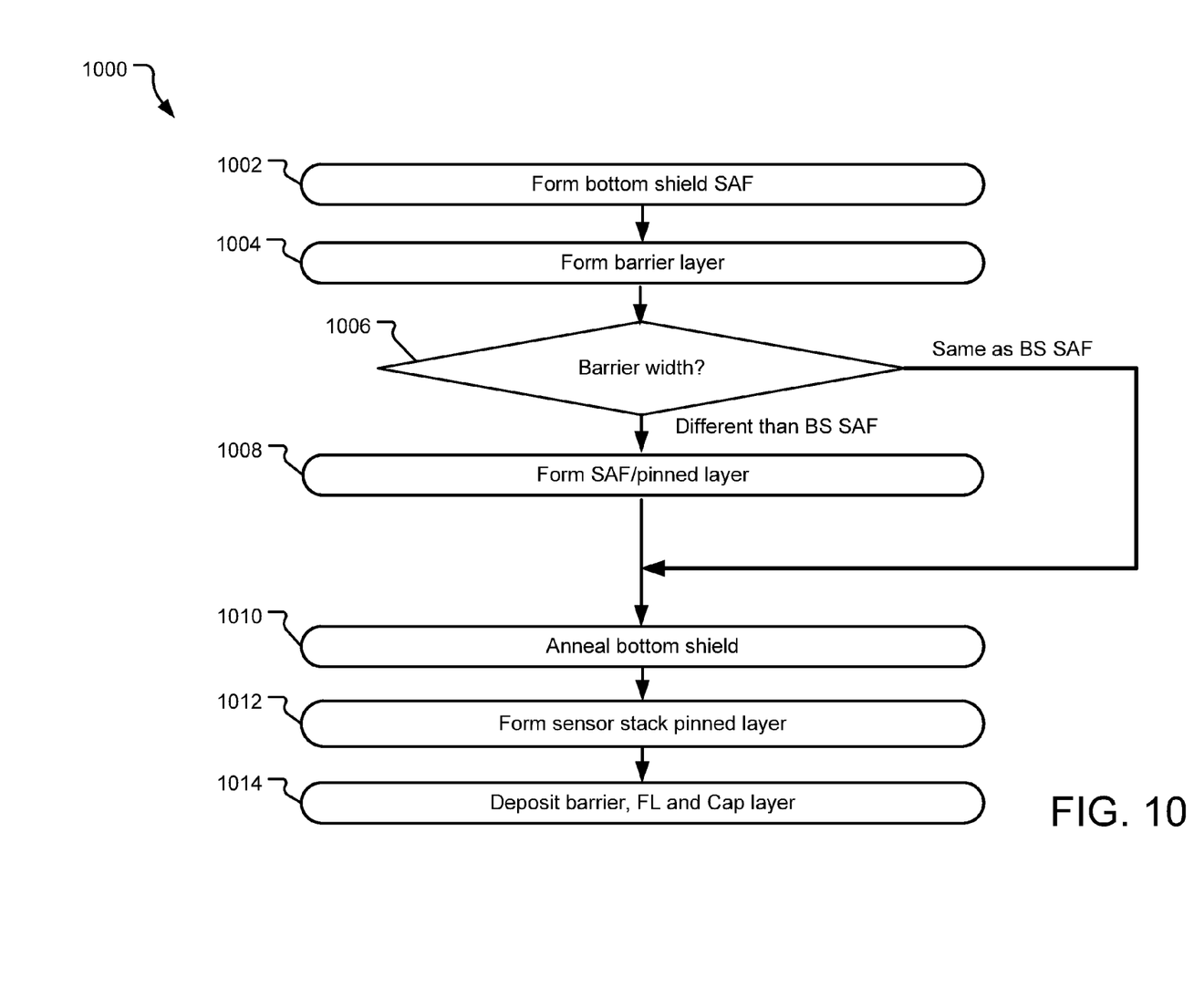

FIG. 10 illustrates example operations 1000 illustrating manufacturing a magnetoresistive sensor illustrated herein. An operation 1002 forms a bottom shield SAF structure. The operation 1002a include a ferromagnetic layer, a barrier layer, and a ferromagnetic layer to form the bottom shield SAF structure. Subsequently an operation 1004 forms a barrier layer of the sensor stack. An operation 1006 determines if the width of the sensor stack is substantially the same as the width of the bottom shield or not. If the widths are different, an operation 1008 forms a SAF/pinned layer. Subsequently, an operation 1010 anneals a bottom shield. An operation 1012 forms a sensor stack pinned layer. Finally, an operation 1014 deposits a barrier layer, a free layer, and a cap layer. If operation 1006 determines that the width of the sensor stack is substantially the same as the width of the bottom shield, operation 1008 does not take place, and operation 1010 anneals the bottom shield. Subsequently, operations 1012 and 1014 follow.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A reader comprising:
    a top shield;
    a magnetically free layer; and
    a first barrier layer on a first side of the free layer,
    wherein the first barrier layer is in direct contact with a bottom shield in a down-track direction, a direction of magnetization of the bottom shield is perpendicular to an air-bearing surface of the reader, the top shield has a magnetization direction parallel to the air-bearing surface of the reader, and the top shield and the bottom shield have a substantially equal cross-track width that is greater than a cross-track width of the free layer.

2. The reader of claim 1 wherein the bottom shield comprises a first synthetic antiferromagnetic (SAF) structure.

3. The reader of claim 2 wherein the SAF structure is pinned without the use of a pinning layer.

4. The reader of claim 3 wherein a direction of magnetization of a reference layer forms an obtuse angle with a direction of magnetization of the free layer in a quiescent state.

5. The reader of claim 2 further comprising a second barrier layer on a second side of the free layer, the second side being opposite the first side of the free layer.

6. The reader of claim 5, wherein the second barrier layer is in contact with the top shield, the top shield having a second SAF structure.

7. The reader of claim 1, wherein the free layer is located between two side shields in a cross-track direction.

8. The reader of claim 1, wherein the free layer is located between two permanent magnets in a cross-track direction.

9. The reader of claim 1, wherein a cross-track width of the bottom shield is substantially similar to combined cross-track widths of the free layer and two side shields.

10. A reader comprising:
    a sensor stack including a free layer and a barrier layer, wherein the sensor stack is located between a top shield and a bottom shield in a down-track direction, wherein the top shield has a magnetization direction parallel to an air-bearing surface of the reader, wherein the barrier layer is in contact with the bottom shield, wherein the top shield and the bottom shield have a substantially equal cross-track width that is greater than a cross-track width of the free layer, and wherein a direction of magnetization of the bottom shield is perpendicular to the air-bearing surface of the reader.

11. The reader of claim 10 wherein the bottom shield further comprises an SAF structure, wherein the SAF structure is pinned without the use of an antiferromagnetic layer.

12. The reader of claim 10 wherein a direction of magnetization of the free layer and a direction of magnetization of a reference layer form an obtuse angle in a quiescent state.

13. A device comprising:
    a top shield;
    a bottom shield, wherein the top shield has a magnetization direction parallel to an air-bearing surface of the device and the bottom shield has a magnetization direction perpendicular to the air-bearing surface; and
    a sensor stack comprising a free layer and a barrier layer, wherein the top shield and the bottom shield have a substantially equal cross-track width that is greater than a cross-track width of the free layer, wherein the barrier layer is in direct contact with the bottom shield, wherein the bottom shield comprises a synthetic antiferromagnetic (SAF) shield layer comprising a reference layer and a pinned layer, wherein the SAF shield layer is pinned without the use of an antiferromagnetic layer and wherein a direction of magnetization of the reference layer forms an obtuse angle with a direction of magnetization of the free layer in a quiescent state.

14. The device of claim 13 wherein the barrier layer is in contact with the SAF shield layer.

* * * * *